(12) United States Patent
Farnik

(10) Patent No.: US 8,248,460 B2
(45) Date of Patent: Aug. 21, 2012

(54) CONFIGURABLE THREE DIMENSIONAL IMAGE PROJECTION SYSTEM

(75) Inventor: Martin Farnik, Postredni Becva (CZ)

(73) Assignee: Robe Lighting s.r.o. (CZ)

( * ) Notice: Subject to any disclaimer, the term of this patent is extended or adjusted under 35 U.S.C. 154(b) by 492 days.

(21) Appl. No.: 12/582,275

(22) Filed: Oct. 20, 2009

(65) Prior Publication Data

US 2010/0103248 A1  Apr. 29, 2010

Related U.S. Application Data

(60) Provisional application No. 61/106,974, filed on Oct. 20, 2008.

(51) Int. Cl.
*H04N 13/04* (2006.01)

(52) U.S. Cl. ............. 348/51; 348/42; 348/234; 348/744
(58) Field of Classification Search ................. 348/42, 348/51, 234, 744
See application file for complete search history.

(56) References Cited

U.S. PATENT DOCUMENTS

| | | | | |
|---|---|---|---|---|
| 5,772,250 A * | 6/1998 | Gasper | | 283/114 |
| 6,762,870 B2 * | 7/2004 | De Vaan | | 359/242 |
| 7,559,653 B2 * | 7/2009 | Silverstein | | 353/7 |
| 2007/0132953 A1 * | 6/2007 | Silverstein | | 353/7 |
| 2007/0291483 A1 * | 12/2007 | Lys | | 362/227 |

* cited by examiner

*Primary Examiner* — Phuoc Nguyen

(57) ABSTRACT

The present invention provides a three dimensional image projection systems comprised of the projection of two different portions of the image in light beams of differing spectral properties by automated luminairs which can be remotely positioned and can reverse roles during repositioning.

1 Claim, 7 Drawing Sheets

CONFIGURABLE THREE DIMENSIONAL IMAGE PROJECTION SYSTEM

RELATED APPLICATION(S)

This application is a utility filing claiming priority of provisional applications: 61/106,974 filed on 20 Oct. 2008.

TECHNICAL FIELD OF THE INVENTION

The present invention generally relates to an image producing luminaire, specifically to a system capable of producing three dimensional images from automated luminaires.

BACKGROUND OF THE INVENTION

Luminaires with automated and remotely controllable functionality are well known in the entertainment and architectural lighting markets. Such products are commonly used in theatres, television studios, concerts, theme parks, night clubs and other venues. A typical product will typically provide control over the pan and tilt functions of the luminaire allowing the operator to control the direction the luminaire is pointing and thus the position of the light beam on the stage or in the studio. Typically this position control is done via control of the luminaire's position in two orthogonal rotational axes usually referred to as pan and tilt. Many products provide control over other parameters such as the intensity, color, focus, beam size, beam shape and beam pattern. The beam pattern is typically provided by a stencil or slide called a gobo which may be a steel, aluminum or etched glass pattern. The products manufactured by Robe Show Lighting such as the ColorSpot 1200E are typical of the art.

It is also well known to utilize a video projection engine as the light source in such a luminaire so as to be able to project moving images and video as well as the simple images provided by the beam patterning gobos. The Digital Spot 5000DT from Robe Show Lighting is an example of such a product.

It is also known to overlay and combine the images from a plurality of imaging luminaires into a single image. These images may completely overlap and be aligned so as to create a brighter image or may be positioned adjacent to each other so as to provide a single larger image. This may be done to increase the apparent brightness of an image buy overlaying two identical images from different luminaires or to provide a three dimensional image where the overlaid images from the two projectors are different and represent a scene or object as it would be seen from two slightly different positions representing the positions of our two eyes.

When two images are overlaid in this manner it is necessary to ensure that each eye of the viewer sees only one of the superimposed images. The left eye sees only the image intended for the left eye and the right eye sees only the image intended for the right eye. There are well known techniques for achieving this. FIG. 1 illustrates a prior art system 100. Projectors 104 and 106 project images 112 and 114 respectively onto screen 102. The two images overlap. The light from projector 104 passes through filter/shutter 108 and the light from projector 106 passes through filter/shutter 110 before impinging on screen 102. One technique involves projecting one image 112 through a red filter 108 and the other 114 through a blue filter 110. The viewer wears spectacles which have one red filtered lens and one blue filtered lens so as to ensure that each eye will only see one image. This technique was used for Hollywood films for many years but tends to give an unnatural color cast to the resulting image.

Another technique uses polarizing filters. One projector may be projected through a vertically oriented polarizing filter and the other through a horizontally oriented filter. The viewer again wears spectacles, but this time with the appropriate polarizing filters in front of each eye. A yet further technique uses filters with circularly polarized lenses. A still further technique utilizes a fast operating blackout shutter in front of each projector and similar blackout shutters in the spectacles; in this technique the left eye and right eye images are shown alternately and the shutters in the spectacles open and close to only allow each eye to see the screen when the correct image is present.

Notwithstanding the filtering technique used the prior arts systems use static luminaires or projectors and require time consuming alignment and set up before the three dimensional effect is achieved. Such systems cannot be moved or re-configured or moved easily.

There is a need for a luminaire projection system which can provide a three dimensional image output that may be incorporated into an automated luminaire.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The present invention generally relates to an image producing luminaire, specifically to a system capable of producing three dimensional images from automated luminaires.

Figure 1:
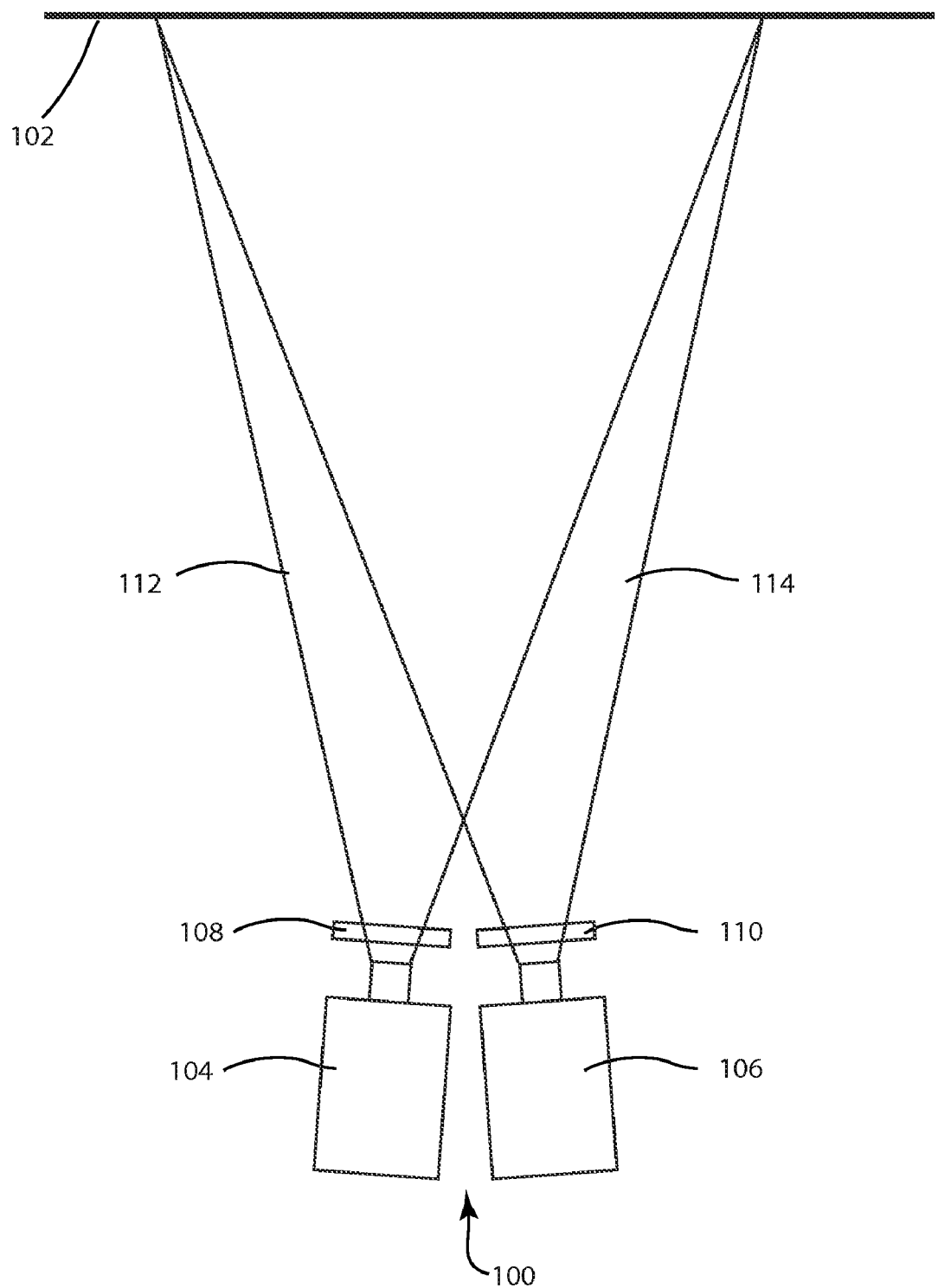
FIG. 1 illustrates a prior art three-dimensional system.
Figure 2:
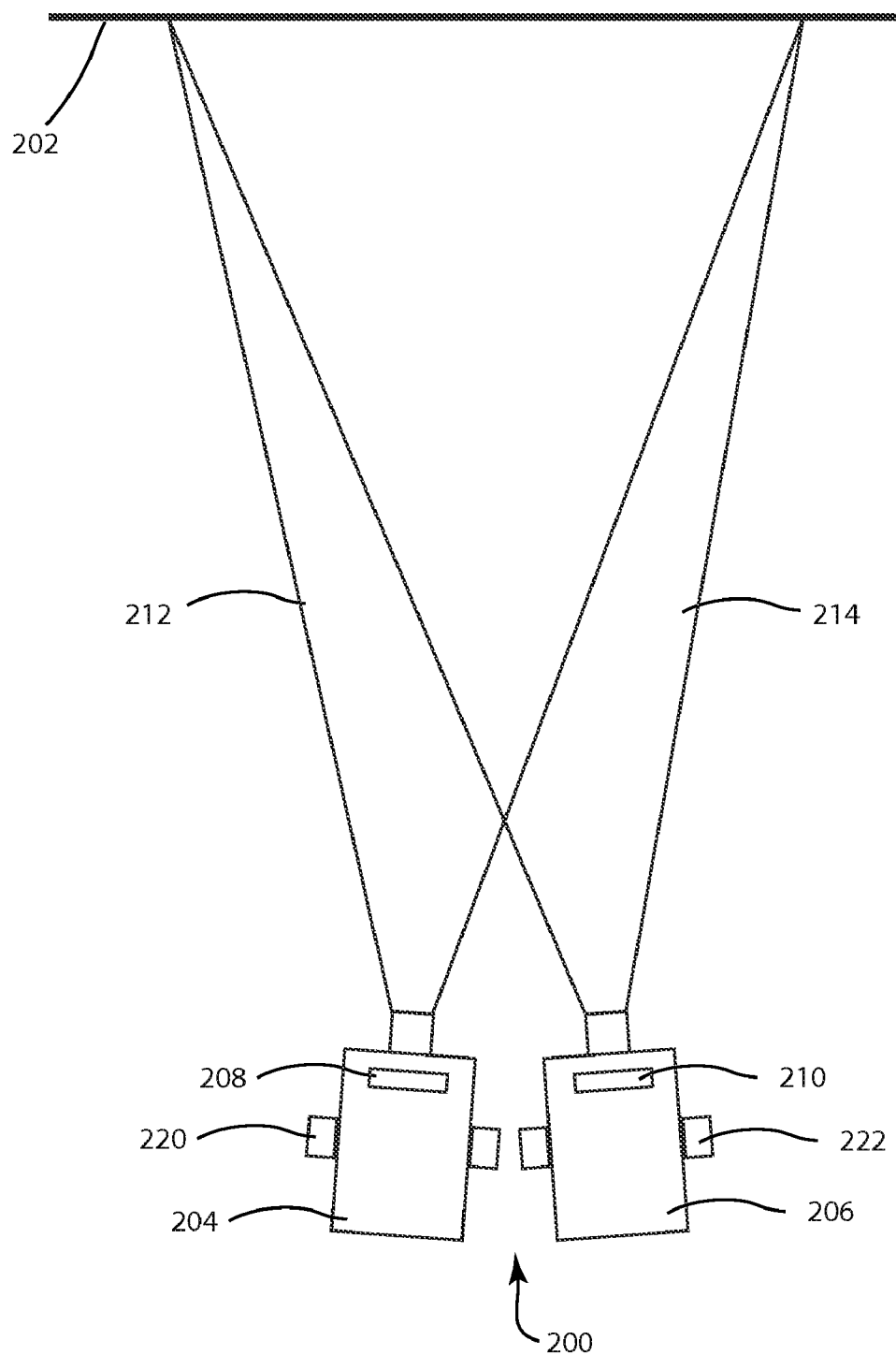
FIG. 2 illustrates an embodiment of the invention.
Figure 4:
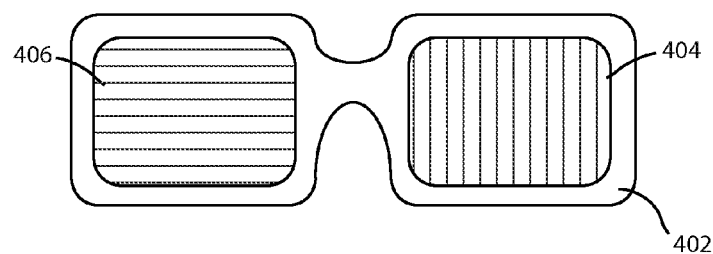
FIG. 4 illustrates the spectacles utilized by the invention.

FIG. 2 illustrates an embodiment of the invention 200 showing a first automated luminaire 204 mounted on a pan and tilt yoke 220 projecting an image 212 through a filter or shutter 208 on to screen 202. A second automated luminaire 206 mounted on a pan and tilt yoke 222 projecting an image 214 through a filter or shutter 210 on to screen 202 such that image 212 and image 214 are substantially superimposed on screen 202. Filter/shutter 208 may be configured to project an image configured such that only the left eye of the viewer will see it and filter/shutter 210 may be configured to project an image configured such that only the right eye of the viewer will see it. The viewer may be wearing spectacles 402 as illustrated in FIG. 4 where the viewer's left eye is covered by filter/shutter 406 and the viewer's right eye is covered by filter/shutter 404. In one embodiment of the invention filter/shutters 208 and 406 may be linearly oriented polarizing filters and filter/shutters 210 and 404 may be further linearly oriented polarizing filters whose polarizing angle is perpendicular to 208 and 406. Polarizing filter 406 is oriented parallel to filter 208 and polarizing filter 404 is oriented parallel to filter 210.

Filters/shutters 208 and 210 may be mounted on a motorized wheel or arm such that they may be inserted or removed from image beam 212 and 214 remotely under control of a lighting desk or other controller. Filters/shutters 208 and 210 may also be mounted such that they may be rotated remotely under control of a lighting desk or other controller. By such means a user may remotely select if a specific luminaire has a filter/shutter inserted and may further choose the orientation of that filter/shutter. This differs from the prior art where such filters/shutters are permanently or semi-permanently fixed within or in front of the luminaire and can only be changed by accessing the unit. The shape and character of the imaging outputs 212 and 214 may further be controlled by optical devices in the automated luminaire not covered by this disclosure such as beam focus, beam size or zoom, image selection, image color, image distortion, image manipulation and other devices well known in the art.

Figure 3:
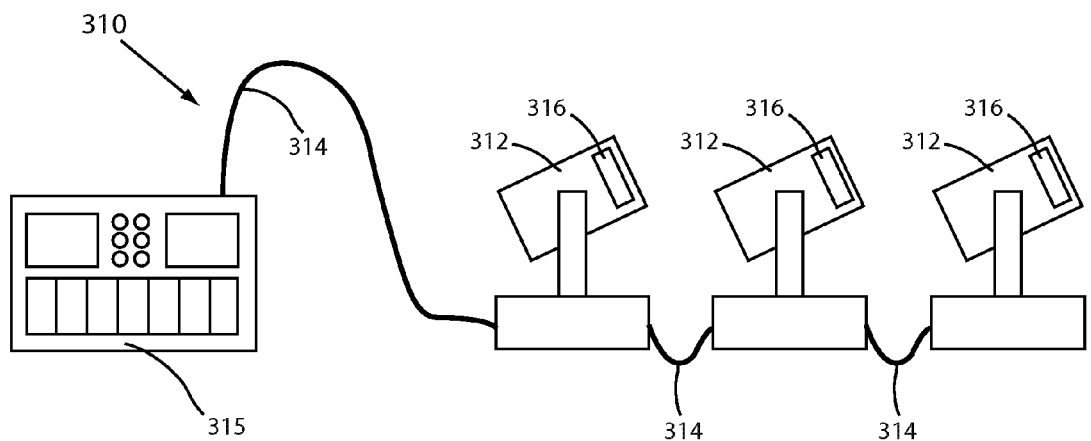
FIG. 3 illustrates a system containing embodiments of the invention.

FIG. 3 illustrates a lighting system 310 utilizing an embodiment of the invention. Lighting control desk 315 connects to a plurality of automated luminaires through a data link 314. Data link 314 may be an RS485 control signal utilizing data protocols such as DMX512 protocol, Artnet, RDM, ACN, an Ethernet connection or any other data transmission system as known in the art. Each automated luminaire 312 may contain a filter selection mechanism 316 containing one or more filters or shutters. Each of these filter selection mechanisms 316 may be independently controlled by control desk 315 through data link 314 so as to present a specific filter or shutter in the light beam path and further may allow orientation of that filter to a predefined position. This facilitates, for example, positioning a polarizing filter across the beam and then rotating that polarizing filter to the desired orientation. The filters/shutters in filter selection mechanism may be chosen from a list including but not limited to; linearly polarizing optical filters, circularly polarizing optical filters, anaglyph filters (red/blue), high speed shutters (LCD or otherwise).

Figure 5:
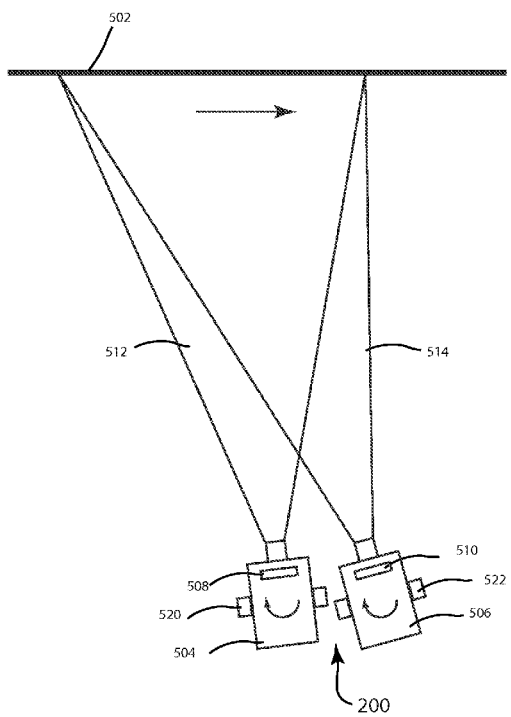
FIG. 5 illustrates an embodiment of the invention moving an image.
Figure 6:
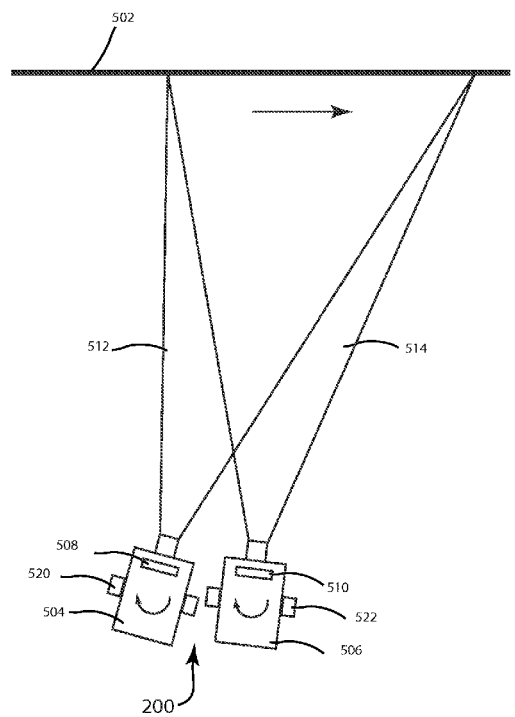
FIG. 6 illustrates an embodiment of the invention moving an image.

FIG. 5 and FIG. 6 illustrate how an embodiment of the invention 200 may be used to create a moving three-dimensional image. Automated luminaires 504 and 506 are mounted on automated pan and tilt yokes 520 and 522 respectively and contain filters/shutters 508 and 510 configured such that the output image beams 512 and 514 provide a three dimensional image on screen 502 when viewed through an appropriate pair of spectacles as described herein.

Automated pan and tilt yokes 520 and 522 may move the automated luminaires 504 and 506 from the position shown in FIG. 5 to the position shown in FIG. 6. The system may be so configured and controlled such that the two automated luminaires move in a synchronized and controlled manner such that the two projected images 512 and 514 remain superimposed on screen 502 throughout the move. This may require simultaneous control and coordination of a number of automated luminaire functions such as pan, tilt, zoom, focus, image rotation, keystone correction, and/or flipping the images. Throughout the move automated luminaire 504 continues to project the image to be viewed by the left eye of the viewer and automated luminaire 506 continues to project the image to be viewed by the right eye of the viewer.

Figure 7:
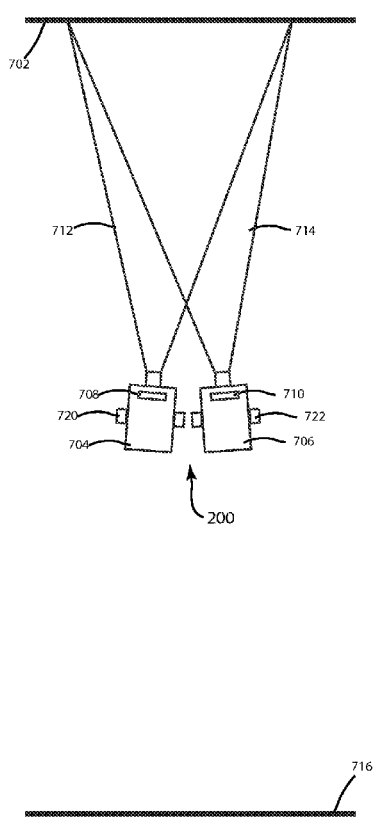
FIG. 7 illustrates a further embodiment of the invention showing use on more than one screen.
Figure 8:
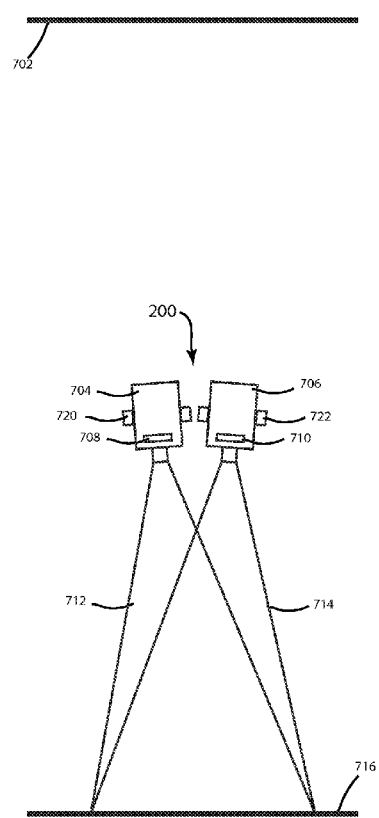
FIG. 8 illustrates a further embodiment of the invention showing use on more than one screen.

FIGS. 7 and 8 illustrate a further embodiment of the invention 200. In FIG. 7 automated luminaires 704 and 706 are mounted on automated pan and tilt yokes 720 and 722 respectively and contain filters/shutters 708 and 710 configured such that the output image beams 712 and 714 provide a three dimensional image on first screen 702 when viewed through an appropriate pair of spectacles as described herein. In this orientation filter 708 is configured so as to match the filter in the spectacles over the left eye of the viewer and filter 710 is configured so as to match the filter in the spectacles over the right eye of the viewer. In FIG. 8 both automated luminaires have been rotated on automated yokes 720 and 722 so that the output light beams are projecting onto second screen 716. However, rotating the automated luminaires 704 and 706 in this manner has also reversed the left/right positioning of the luminaires. Thus luminaire 706 is now on the left and luminaire 704 is on the right. The invention is able to deal with this situation and correct the image filtering in a way that the prior art cannot by remotely switching the orientation of filter/shutters 708 and 710 such that filter 708 is reconfigured so as to match the filter in the spectacles over the right eye of the viewer and filter 710 is reconfigured so as to match the filter in the spectacles over the left eye of the viewer. Thus for any position or orientation of automated luminaires 704 and 706 a corresponding appropriate position and orientation of filters/shutters 708 and 710 may be chosen such that a correctly formed three dimensional image is visible on the screen. It may also be necessary to make the other adjustments allowed by the projection beam modulating functionalities previously described.

Figure 9:
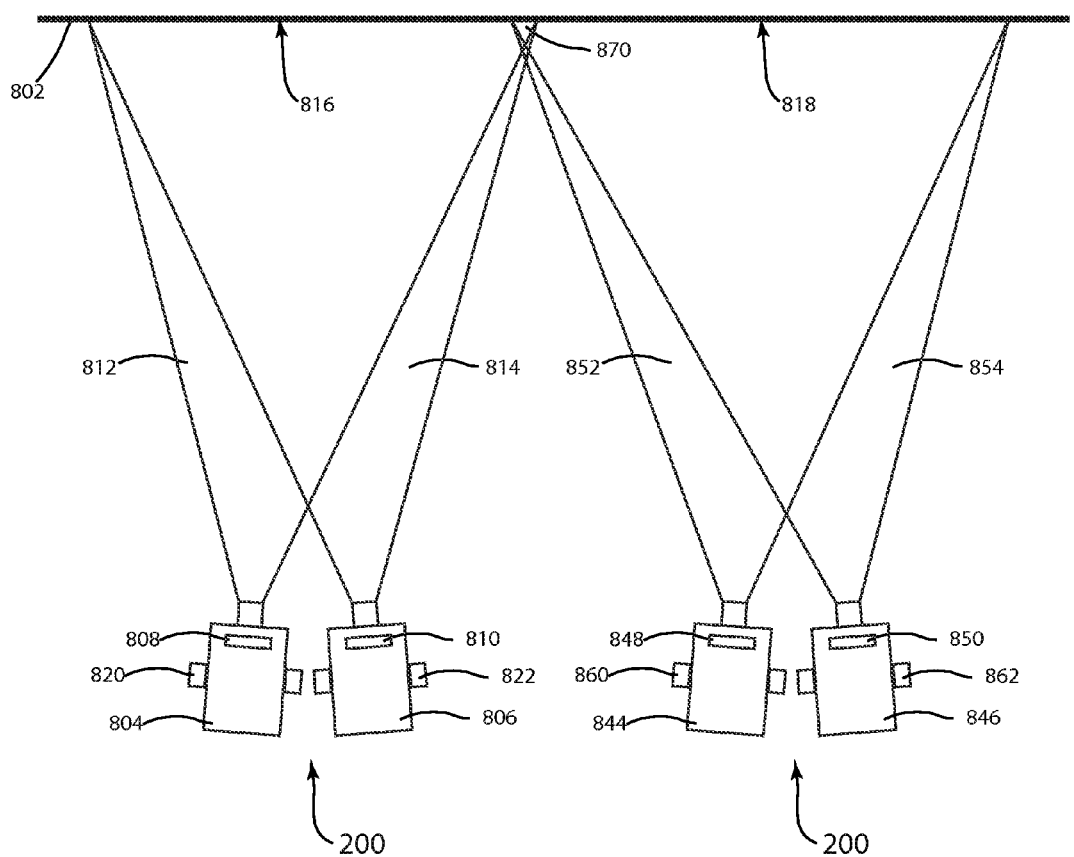
FIG. 9 illustrates a further embodiment of the invention showing the use of abutting images to create a larger image

FIG. 9 illustrates how multiple embodiments of the invention 200 may be situated adjacent to each other to provide a single combine large image. Automated luminaires 804 and 806 cooperate to form a first overlaid three dimensional image 816 from beams 812 and 814 on screen 802. Similarly automated luminaires 844 and 846 cooperate to form a second overlaid three dimensional image 818 from beams 852 and 854 on screen 802. Images 816 and 818 may separately provide portions of a single larger image which is viewable on screen 802. Images 816 and 818 may be adjacent and aligned on screen 802. Images 816 and 818 may contain a common image portion such that may be overlapped as shown by region 870. Such overlap 870 may assist in presenting the two images as a single seamless overlapped image and the techniques for producing this overlap and controlling the brightness of the two images in this region are well known in the art. Motion and filtering of the two images produced by the respective luminaire pairs may be synchronized so as to maintain the appearance of a single large image. Although two pairs of luminaires are illustrated here the invention is not so limited and any number of pairs of luminaires may be abutted to form larger images of any shape or format. For example four pairs of luminaire may be used to form a large three dimensional image comprising 2×2 smaller three dimensional images.

Figure 10:
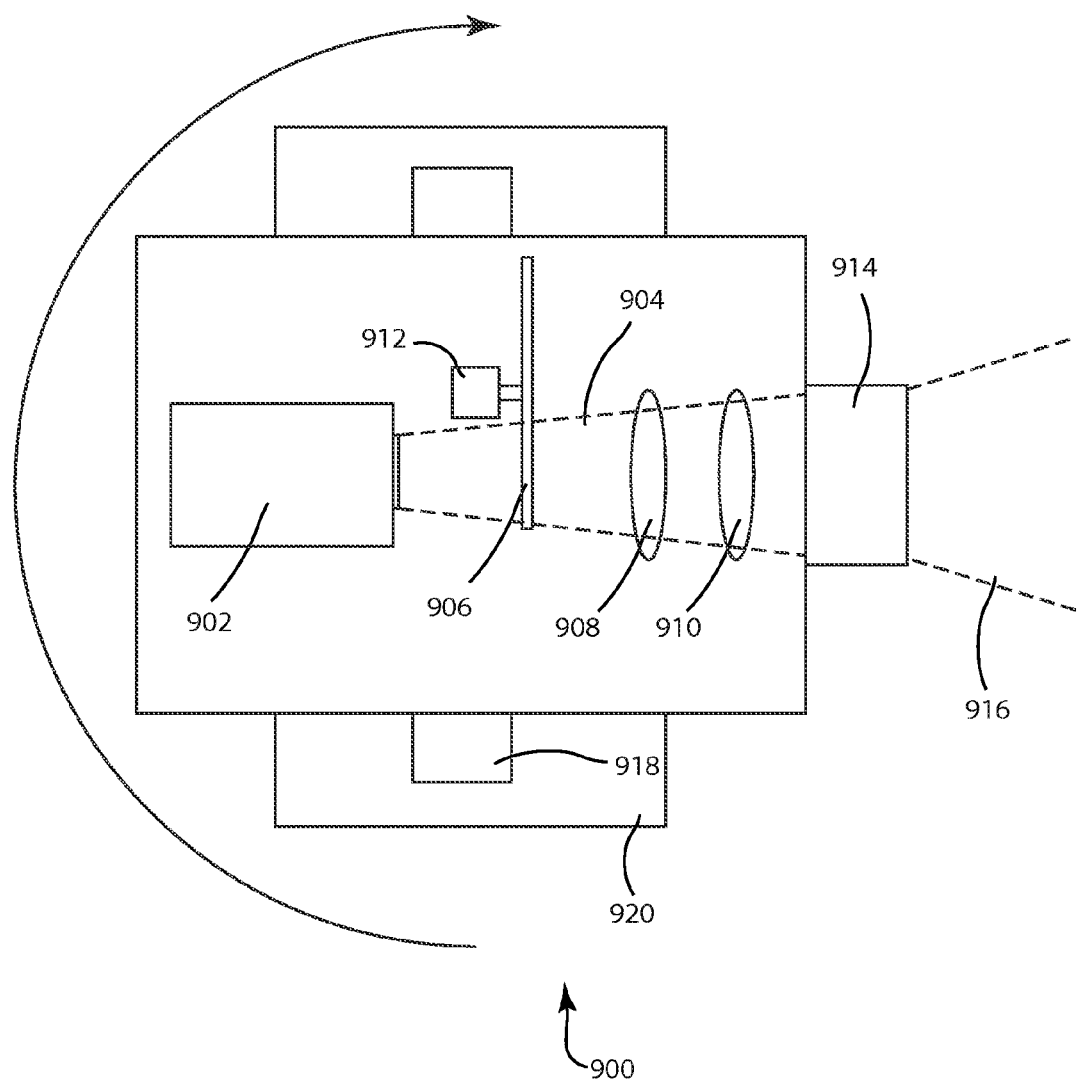
FIG. 10 illustrates the detail of an embodiment of the invention

FIG. 10 illustrates the detail of an embodiment of the invention. Automated luminaire 900 contains an imaging light source 902. Imaging light source 902 may comprise an illuminator and static image such as a projection slide or gobo or may comprise a video projector light source utilizing, but not limited to, a liquid crystal display (LCD), digital micro mirror device (DMD) or other light valve image producing device as well known in the art. The light beam 904 produced by imaging light source 902 may pass through beam modulating devices such as an image polarizer 906 and zoom and focus lenses 908 and 910 before exiting through final lens 914 as output beam 916. Image polarizer 906 may be rotated by actuator 912 so as to provide vertical polarization, horizontal polarization or any other angle of polarization. Additionally image polarizer 906 may be completely removed from light beam 904 by actuator 912 so as to leave the beam unaffected. Actuator 912 may be a stepper motor, servo motor, solenoid or other actuator as well known in the art. Zoom and focus lenses 908 and 910 may similarly be moved through actuators. All actuators may be either locally or remotely controlled.

The automated luminaire may be mounted on a pan and tilt yoke 918 connected to a fixed support or platform 920 allowing the motion in two orthogonal axes of the entire image producing chain.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An projection system for generating three dimensional images comprised of:
    a. first automated luminaire capable of projecting a first portion of the three dimensional image with one set of spectral properties; and
    b. a second automated luminaire capable of projecting a second portion of the three dimensional image with a second set of spectral properties and
    c. wherein the automated luminaires can be remotely positioned and where the spectral properties of the luminaires can be reversed before during or after repositioning of the luminaire, and
    d. wherein throughout said positioning said projected images from said first and second luminaires remain superimposed throughout said positioning.

* * * * *